(12) United States Patent
Baca et al.

(10) Patent No.: US 9,057,857 B2
(45) Date of Patent: Jun. 16, 2015

(54) FIBER OPTIC ASSEMBLY FOR OPTICAL CABLE

(71) Applicant: Corning Optical Communications LLC, Hickory, NC (US)

(72) Inventors: Adra Smith Baca, Rochester, NY (US); Anne Germaine Bringuier, Taylorsville, NC (US); Christopher Mark Quinn, Hickory, NC (US); Lori Ann Seeley, Penn Yan, NY (US); Brandon Robert Williamson, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/313,515

(22) Filed: Jun. 24, 2014

(65) Prior Publication Data

US 2015/0003795 A1    Jan. 1, 2015

Related U.S. Application Data

(60) Provisional application No. 61/840,636, filed on Jun. 28, 2013.

(51) Int. Cl.
*G02B 6/44* (2006.01)
*G02B 6/02* (2006.01)

(52) U.S. Cl.
CPC .............. *G02B 6/443* (2013.01); *G02B 6/4494* (2013.01); *G02B 6/4486* (2013.01); *G02B 6/02395* (2013.01); *G02B 6/4429* (2013.01); *G02B 6/441* (2013.01); *G02B 6/4401* (2013.01)

(58) Field of Classification Search
CPC ...... G02B 6/445; G02B 6/4401; G02B 6/441; G02B 6/4486; G02B 6/02395; G02B 6/4429
USPC .......................... 385/100, 102, 105, 109–112
See application file for complete search history.

(56) References Cited

U.S. PATENT DOCUMENTS

| 5,031,996 A | 7/1991 | Saller et al. ................. 350/96.23 |
| 5,561,721 A | 10/1996 | Mutz .............................. 382/205 |
| 5,574,816 A * | 11/1996 | Yang et al. ..................... 385/109 |

(Continued)

FOREIGN PATENT DOCUMENTS

| CN | 1206662 C | 6/2005 | ............... H01B 3/44 |
| CN | 100366961 C | 2/2008 | ............... F16K 1/00 |

(Continued)

OTHER PUBLICATIONS

Patent Cooperation Treaty, International Search Report and Written Opinion for International Application No. PCT/US2014/043784, Mailing Date Sep. 11, 2014—9 pages.

(Continued)

*Primary Examiner* — Ryan Lepisto
*Assistant Examiner* — Guy Anderson

(57) ABSTRACT

A fiber optic assembly includes a buffer tube forming an elongate passage and a plurality of optical fibers positioned therein. The buffer tube includes at least one layer of a composite material that includes a base material and a filler material blended therein. Particles of the filler material have an acicular structure, having a longest dimension that is on average at least ten times a narrowest dimension of the particles. Further the buffer tube has kink resistance.

20 Claims, 3 Drawing Sheets

(56) References Cited

U.S. PATENT DOCUMENTS

| | | | |
|---|---|---|---|
| 5,761,362 A | 6/1998 | Yang et al. | 385/109 |
| 6,041,153 A | 3/2000 | Yang | 385/109 |
| 6,215,931 B1 | 4/2001 | Risch et al. | 385/109 |
| 6,215,932 B1 * | 4/2001 | Hardwick et al. | 385/114 |
| 6,317,542 B1 * | 11/2001 | Hardwick et al. | 385/114 |
| 6,321,013 B1 * | 11/2001 | Hardwick et al. | 385/114 |
| 6,324,324 B1 * | 11/2001 | Dixon et al. | 385/100 |
| 6,404,962 B1 * | 6/2002 | Hardwick et al. | 385/114 |
| 6,411,403 B1 * | 6/2002 | Siddhamalli | 385/109 |
| 6,430,344 B1 * | 8/2002 | Dixon et al. | 385/109 |
| 6,487,345 B1 * | 11/2002 | Dixon et al. | 385/100 |
| 6,683,125 B1 | 1/2004 | Augestad et al. | 524/490 |
| 6,749,446 B2 * | 6/2004 | Nechitailo | 439/114 |
| 6,801,696 B2 | 10/2004 | Davis et al. | 385/109 |
| 7,307,125 B2 | 12/2007 | Chundury et al. | 525/240 |
| 7,801,404 B2 | 9/2010 | Pavan et al. | 385/100 |
| 8,265,442 B2 * | 9/2012 | Overton | 385/128 |
| 2003/0228116 A1 | 12/2003 | Davis et al. | 385/109 |
| 2005/0013566 A1 | 1/2005 | Storaasli et al. | 385/113 |
| 2006/0045439 A1 * | 3/2006 | Brown et al. | 385/100 |
| 2008/0145010 A1 | 6/2008 | Overton et al. | 385/115 |
| 2008/0279514 A1 * | 11/2008 | Kundis et al. | 385/113 |
| 2009/0274424 A1 * | 11/2009 | Debut et al. | 385/102 |
| 2014/0064683 A1 * | 3/2014 | Weimann | 385/113 |

FOREIGN PATENT DOCUMENTS

| | | | |
|---|---|---|---|
| EP | 0968809 A1 | 1/2000 | B29C 47/06 |
| EP | 0760108 B9 | 9/2001 | G02B 6/44 |
| EP | 0890860 B1 | 8/2009 | G02B 6/44 |
| EP | 0945479 B1 | 4/2011 | C08J 5/04 |
| JP | 3834168 B2 | 7/2006 | G02B 6/44 |

OTHER PUBLICATIONS

C.E. Clyburn III & C.L. Tedder, "Selection of a Robust Buffer Tube Material for Outdoor Optical Fiber Cable," 1997, *Proceedings from the Society of Plastics Engineers 55th Annual Technical Conference*, vol. 3, pp. 3266-3270.

* cited by examiner

FIBER OPTIC ASSEMBLY FOR OPTICAL CABLE

PRIORITY

This application claims the benefit of priority under 35 U.S.C. §119 of U.S. Provisional Application Ser. No. 61/840,636 filed on Jun. 28, 2013, the content of which is relied upon and incorporated herein by reference in its entirety.

BACKGROUND

Aspects of the present disclosure relate generally to fiber optic cables and components thereof, and more specifically to buffer tubes containing one or more optical fibers as may be part of the fiber optic cables.

Buffer tubes in fiber optic cables typically contain optical fibers and protect the fibers from various mechanical stresses induced either at installation of the cable or occurring during use over the lifetime of the cable, such as compression forces, impacts, and bending stresses. Therefore, buffer tubes should be formed from a material with high modulus, to have high compression resistance. However, buffer tubes should also be designed to retain flexibility, such that the buffer tube can be routed easily and stored in small coils. Conventional buffer tube designs may have good crush performance but insufficient flexibility, or vice versa. Some conventional designs are also susceptible to effects of hydrolysis, resulting in brittleness. Some conventional buffer tube materials have issues with shrinking over time, called "shrink back," and/or are formed with materials having poor dimensional stability with changes in temperature, which may limit the size of buffer tubes to be wide enough to not, at times, constrict around the optical fibers and/or pull away from connectors attached to the fibers.

A need exists for a fiber optic assembly including a buffer tube that sufficiently protects optical fibers therein from compressive stresses, while retaining high flexibility and impact resistance. Ideally, the buffer tube should have good performance with respect to hydrolysis and not excessively attenuate the optical fibers due to temperature-related expansion or contraction of the buffer tube in the field.

SUMMARY

One embodiment relates to a fiber optic assembly that includes a buffer tube forming an elongate passage and a plurality of optical fibers positioned therein. The buffer tube includes at least one layer of a composite material that includes a base material and a filler material blended therein. Particles of the filler material have an acicular structure, having a longest dimension that is on average at least ten times a narrowest dimension of the particles. Further the buffer tube has kink resistance.

In some embodiments, the buffer tube may be densely packed with optical fibers. In some such cases, use of bend insensitive optical fibers in the buffer tube may reduce the impact of micro- and/or macro-bending attenuation, potentially caused by bending the buffer tube and contact between the optical fibers and the filler-material of the buffer tube or other protrusions from the interior surface of the buffer tube. For example, the buffer tube may be lined with water-swellable material, such as superabsorbent powder, which may also contact the optical fibers.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments now described in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
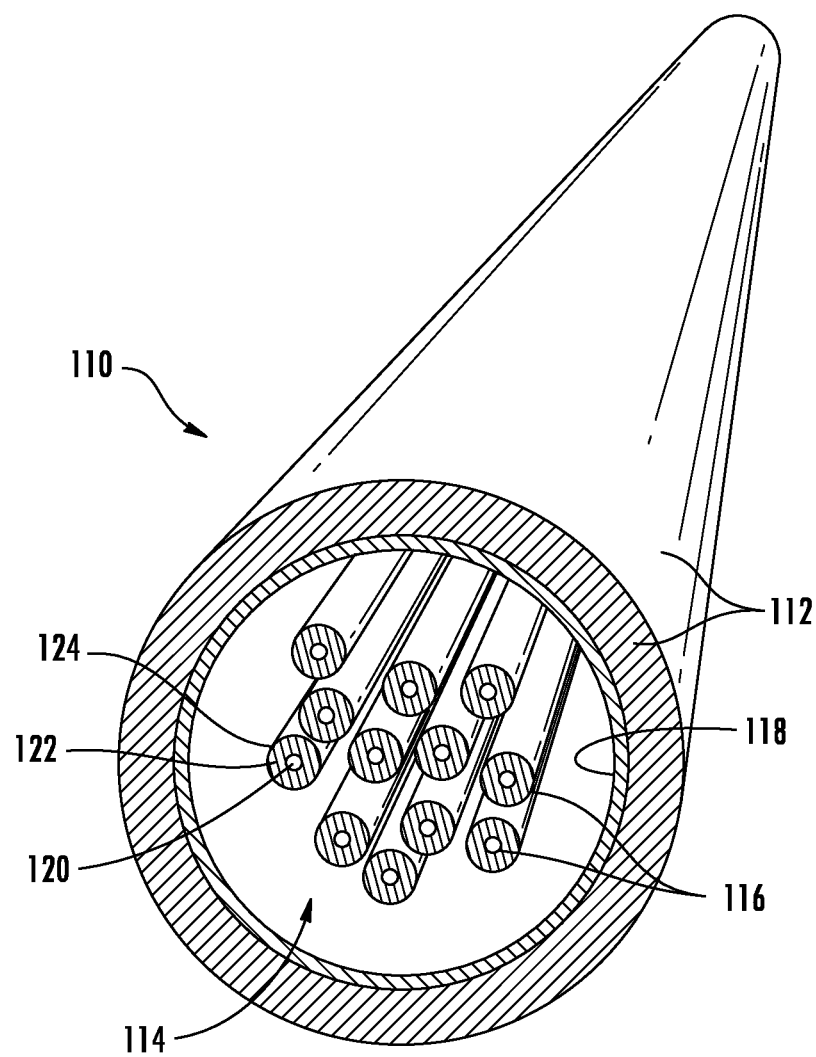
FIG. 1 is a perspective and cross-sectional view of a buffer tube containing optical fibers, according to an exemplary embodiment.

Referring to FIG. 1, fiber optic assembly 110 includes a tube in the form of a buffer tube 112. The buffer tube 112 may be round in cross-section, forming an elongate annular passage 114. One or more optical fibers 116 are positioned in the passage 114, such as at least two, at least four, at least twelve optical fibers 116. In some embodiments, the fiber optic assembly 110 may be one of several such assemblies, such as six assemblies or more, that are stranded around a central strength member and located in a jacket of a fiber optic cable.

In some embodiments, the buffer tube 112 includes a water-swellable material positioned in the passage 114 of the buffer tube 112, such as lining the passage 114 or integrated with yarn extending through the passage 114. The water-swellable material may be a powder 118, such as a powder of super-absorbent polymer. As such, the buffer tube 112 may be a "dry" buffer tube configured to limit the flow of water through the passage 114. The powder 118 may be adhered to the interior wall of the buffer tube 112 defining the passage 114. In some embodiments, the powder 118 may be partially embedded in the wall of the buffer tube 112. In some embodiments, particles of the powder 118 are small, having an average largest dimension of 150 micrometers or less. In some contemplated embodiments, fire-retardant powder or other powders may be used in place of or in combination with the water-swellable material. In other contemplated embodiments, the passage 114 may include gel, grease, or another water-blocking material that is not "dry" and/or water-swellable.

The one or more optical fibers 116 may be single-mode optical fibers and/or multi-mode optical fibers. The optical fibers 116 may have one core, or more than one core each (i.e., "multi-core" fibers). The optical fibers 116 may be loosely positioned in the buffer tube 114, as shown in FIG. 1. In other embodiments, optical fibers may be tightly packed into a buffer tube. In some embodiments, optical fibers are arranged side-by-side with one another and bound in a common matrix, and form a fiber optic ribbon and/or a stack of such ribbons. In some embodiments, optical fibers are surrounded by a tight-buffer layer, such as a coating of polyvinyl chloride or another polymer, which may be fire-retardant and which may increase the overall diameter of the optical fiber to at least 500 micrometers and/or 1000 micrometers or less, such as about 900 micrometers.

According to an exemplary embodiment, the buffer tube 112 has an outer diameter OD of 3 millimeters or less, such 2.5 millimeters or less, 2.4 millimeters or less, 2.2 millimeters or less, or even smaller, such as 2 millimeters or less. However, in other embodiments, the buffer tube 112 may be wider, such as if the optical fibers 116 are tight-buffered optical fibers, and if the buffer tube 112 further comprises aramid or other strength members. In some embodiments, the exterior periphery of the buffer tube 112 may not have a round cross-section, but where the exterior periphery defines an area interior thereto that is equivalent to the area of a circle with the above-described diameter OD.

In some such embodiments and/or in other embodiments, the passage 114 of the buffer tube 112 may have a diameter ID (i.e., the interior diameter ID of the buffer tube 112) of at least 1 millimeter, such as at least 1.2 millimeters, at least 1.4 millimeters, or greater. In contemplated embodiments, the passage 114 may have a smaller diameter ID, and/or the passage 114 may not have a round shape in cross-section, but where the passage 114 has an area in cross-section equivalent to the area of a circle with the above-described diameter ID. For example, the buffer tube 112 may have an outer diameter OD of 2.4 millimeters or less and a passage diameter ID of at least 1.4 millimeters, or any other combination of such dimensions disclosed above.

According to an exemplary embodiment, the buffer tube 112 includes at least one layer of a composite material. For example, the buffer tube 112 may be formed from two or more layers of material, at least one of which includes the composite material; or the buffer tube may be formed from a single, continuous layer of the composite material. The composite material of the buffer tube includes a base material and a filler material blended into the base material. In some embodiments, the filler material is uniformly blended into the base material and evenly distributed in the base material. Further, particles of the filler material are particularly small, such that the composite material may function more like a homogeneous material with isotropic strength properties. In some such embodiments, the composite may be described as a colloid, such as a solid sol colloid where the particles of the filler material are not discernible with the naked eye and/or are particularly small, as disclosed herein. In other contemplated embodiments, the filler material may be well dispersed but still be generally oriented in a pattern or direction such that the material has anisotropy, such resulting as filler fiber lengthwise orientation in the flow direction of extrusion manufacturing.

According to an exemplary embodiment, the base material of the composite material is polymeric. In some embodiments, the base material is a polypropylene copolymer, such as an impact-modified polypropylene having a rubberized content of at least 10% thereof by volume, such as at least 15% thereof by volume. In some embodiments, the base material is a thermoplastic polyolefin. In contemplated embodiments, the base material is a thermoplastic elastomer or a cross-linked polyethylene. In some embodiments, the base material has an unfilled modulus of elasticity (e.g., Young's modulus, secant modulus, flexural modulus, tensile modulus) in the range of 1200 to 1800 megapascals, such as at least 1400 megapascals, at least 1450 megapascals, at least 1500 megapascals, and/or no more than 1700 megapascals, such as no more than 1600 megapascals.

According to an exemplary embodiment, the filler material of the composite material includes an inorganic material. In other embodiments, the filler material includes an organic material, or a blend of inorganic and organic materials. The filler materials may have a modulus that is greater than the base material. In some embodiments, at least in part due to the geometry and dispersion of particles of the filler material in the base material, the filler material raises the modulus of elasticity of the base material by at least 200 megapascals relative to the base material alone (i.e., unfilled modulus), such as at least 300 megapascals. In some embodiments, the elastic modulus of the composite material is at least 2000 megapascals. In some embodiments, such as with a filled polypropylene copolymer, as described herein, the buffer tube may have an elastic modulus of at least 2000 megapascals, while still having an elongation at break of at least 50%, such as at least 80%, or even at least 150%, combining strong crush performance with resilient durability upon flexing.

In addition to raising the modulus of elasticity of the base material, in some embodiments, at least in part due to the geometry and dispersion of particles of the filler material in the base material, the filler material increases tensile strength properties of the base material relative to the base material alone, as well as improving the dimensional stability of the buffer tube 112 during processing and during temperature cycling of the buffer tube 112, allowing for a reduction of buffer tube OD, as discussed above. Further, adequate dispersion of the filler material, small sizing of the filler particles, and selection of the base material, such as polypropylene copolymer or polyolefin blend, provides the buffer tube with increased modulus even at cold temperatures with a sufficient kink diameter.

In some embodiments, the filler material may include ultrafine particles, such as ultrafine particles of a clay, such as halloysite. In some embodiments, the filler material may include a micronized form of hydrated magnesium silicate, such as 500-mesh talcum powder that may be surface-modified with a compatibilizer. In contemplated embodiments, calcium inosilicate mineral, such as micronized wollastonite, may be included in the filler material, or calcium carbonate particles. In still other embodiments, ultrafine phyllosilicate particles may be used with the filler material, such as with fire-retardant fiber optic assemblies, such lamellar silicates, such as nano-sized mica particles. Particles of filler material may be reacted with compatibilizers, such as organosilanes, to provide better interfacial adhesion to the base material. In other contemplated embodiment, other filler materials or combinations of such filler particles may be used.

Filler materials disclosed herein, such as hydrated magnesium silicate, may have a higher thermal conductivity than polyolefins or other base materials, therefore the compounded form of the composite material has an increased thermal conductivity, allowing faster cooling during extrusion, resulting in higher line speeds and faster production rates. Further, filled polymer for buffer tube, as disclosed herein, may include increased flame retardancy; increased crystallinity due to the filler material additionally acting as a nucleating agent, further leading to a higher composite material elastic modulus, as disclosed herein; increased heat deflection; increased creep resistance of the compounded composite material relative to the unfilled base material; and/ or increased chemical resistance and better barrier properties, allowing use of the buffer tubes in more-demanding environments, such as those subjected to steam or exposed to hydraulic fluids or other chemicals.

Inorganic filler materials compounded into the base material, may include either (i) a platy or lamellar structure or (ii) an acicular structure. In some such embodiments, the particles have a longest dimension that is on average substantially greater than a narrowest dimension of the particles, such as at least five times greater, at least ten times greater, and/or at least 25 times greater. The higher ratio allows cohesive reinforcement of the base material and better mechanical strength. In some embodiments, particles of the filler material have a form factor that is less than 1 micrometer in all dimensions (i.e., cross-sectional dimensions, such as width, height, length, diameter), such as less than 950 nanometers, on average of at least 100 randomly selected samples. For example, platy structures of some filler particles may be very thin, exfoliated lamella with thickness on the order of a few nanometers compared to length and width of the plates typically on the order of several hundred nanometers up to 1 micron. Acicular particles of the filler material may have an aspect ratio that is at least 10:1 and/or less than 50:1, such as less than 20:1. In other embodiments, particles of the filler material have a form factor that is less than 1 micrometer in one or more cross-sectional dimension (i.e., cross-sectional dimensions, such as at least one of width, height, length, diameter), such as less than 950 nanometers, on average of at least 100 randomly selected samples. In some embodiments, the filler particles may be generally round or spherical and/or having a low aspect ratio (e.g., aspect ratio about 1, within 20% of 1), such as fumed silica, glass beads, pumice, calcium carbonate; and such filler may also include dimensions as disclosed herein.

Large quantities of filler materials in the base material may render the resulting buffer tube stiff, with too little flexibility at low temperatures. However, Applicants have discovered that use of particularly small particles of filler materials allows use of a reduced amounts of loading of the base material with filler material, resulting in a substantial improvement in modulus of the compounded material. Using base and filler materials disclosed herein, the buffer tube 112 may have an excellent compromise between stiffness and impact resistance/flexibility at cold temperature. According to an exemplary embodiment, the ratio of the fill material to the base material in the composite material may range from 2 to 50% by volume, such as 3 to 30%, such as less than 20% by volume, depending on the aspect ratio of the filler material and the choice of base material. According to an exemplary embodiment, the ratio of the fill material to the base material in the composite material may range from 3 to 40% by weight, such as 5 to 40% by weight, depending on the aspect ratio of the filler material and the choice of base material.

Figure 2:
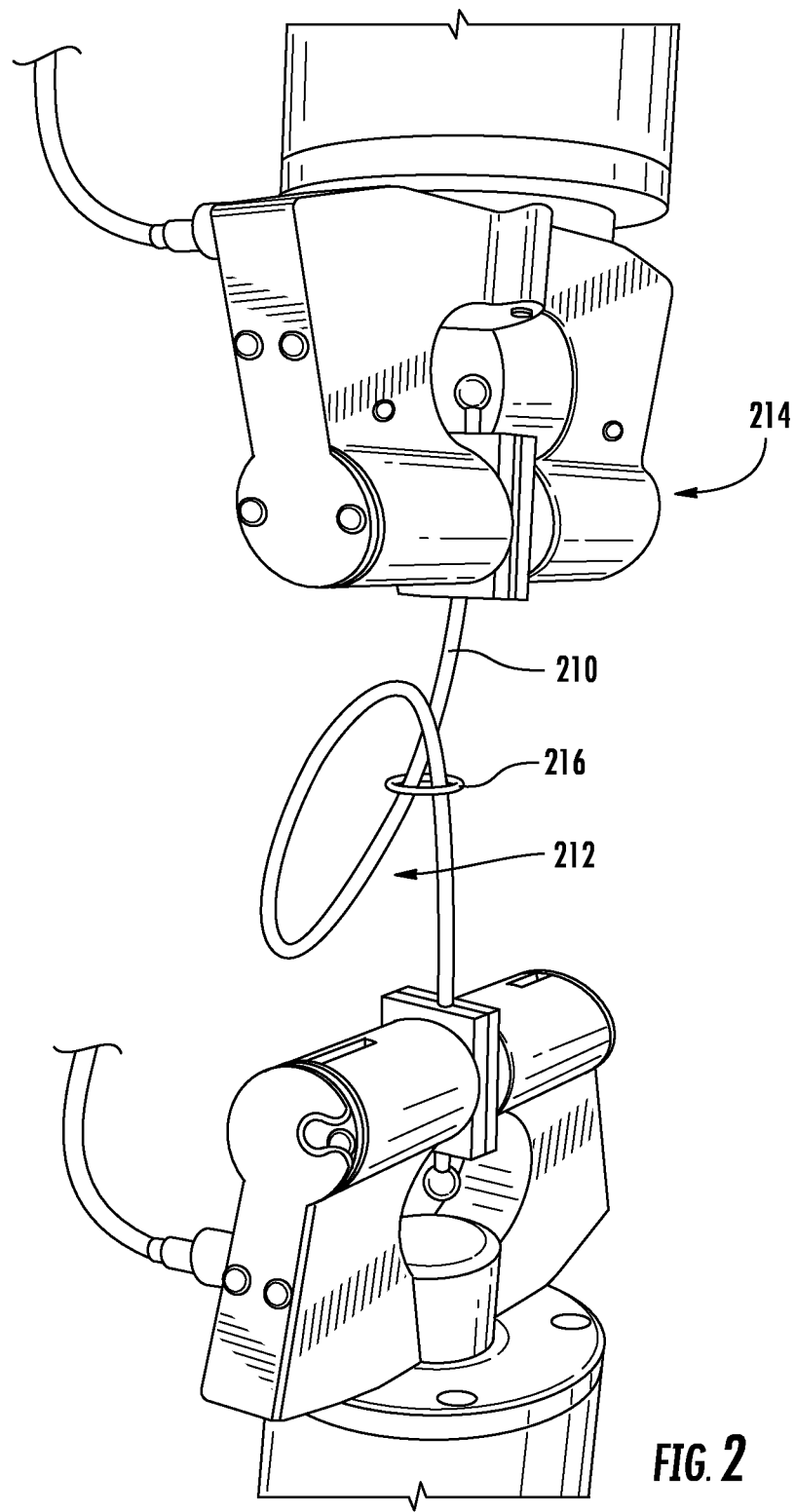
FIGS. 2-3 are digital images of a buffer tube undergoing kink testing.
Figure 3:
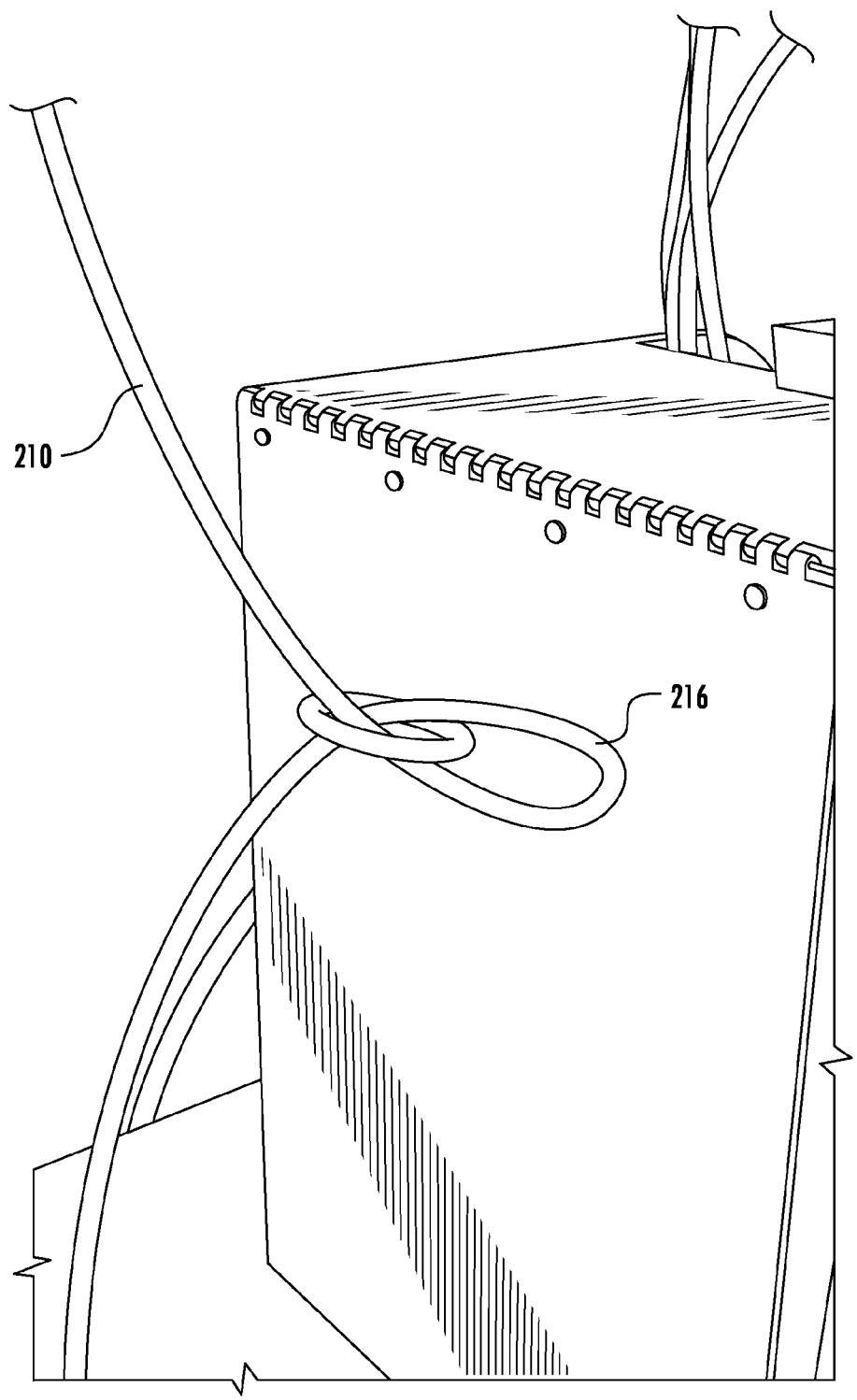

Referring now to FIGS. 2-3, one way to quantify qualities of buffer tubes disclosed herein is in terms of kink resistance, which may be determined through loop testing. Loop testing determines the diameter of a loop and required force at which a particular buffer tube 210 will kink. During a test, a loop 212 with a diameter of 85 mm is formed and placed in the grips 214 of a tensile test machine, as shown in FIGS. 2-3. A low friction plastic ring 216 at the cross-over point holds the loop 212 in place. The top end of the buffer tube 210 is pulled at a rate of 250 millimeters per minute, decreasing the diameter of the loop 212 until kinking occurs. Kinking may be determined both by visual observation and by a 10% drop in the force from the peak force required to pull the buffer tube 210. For buffer tubes as disclosed herein, Applicants predict a kink diameter of less than 25 millimeters, such as less than 20 millimeters, and corresponding force of at least 0.5 newtons, such as a buffer tube having a 2.2 millimeter outer diameter OD and 1.6 millimeter inner diameter ID formed from filled thermoplastic polyolefin. Further, Applicants predict that the diameter at kink for buffer tubes disclosed herein will not increase more than 20% after 30 days aging at 85 degrees Centigrade and 85% relative humidity.

In addition to excellent kink performance, buffer tubes 112 disclosed herein may have particularly strong crush performance. Crush testing may be performed with a sample of the buffer tube that is 6 millimeters in length. The sample is placed between an upper movable plate and a lower stationary plate to receive a lateral compressive load perpendicular to the longitudinal axis of the tube. The load is applied by the tensile test machine at a speed of 6 millimeters per minute until the buffer tube is compressed to 50% of the original diameter. The crush loads at crush of 5% of the original diameter and at 25% of the original diameter due to tube compressive strain are recorded. For buffer tubes 112 disclosed herein, Applicants predict a crush load at 25% compression to be at least 20 newtons, such as at least 25 newtons, at least 30 newtons, and even at least 40 newtons is contemplated in at least some embodiments, such as those with larger tube dimensions. Further, Applicants predict that the magnitude of crush load required to achieve 25% compression of the buffer tube 112 will not decrease more than 20% after 30 days aging at 85 Centigrade and 85% relative humidity. Crush and kink testing, as shown in FIGS. 2-3, is performed without optical fibers in the buffer tubes.

Referring once more to FIG. 1, particles of the filler material may jut out from the interior of the buffer tube 112, roughen the interior of the buffer tube 112, and/or cause protrusions to extend from the interior of the buffer tube 112. As the size of buffer tubes disclosed herein may be particularly small, and the quantity and size of optical fibers 116 in the buffer tube 112 may be relatively high, and the optical fibers 116 may contact walls of the buffer tube 112 in the passage 114. The contact may stress the optical fibers 116, which may lead to attenuation of the optical fibers 116. In some embodiments, the buffer tube 112 may further include larger particles of water-swellable material or fire-retardant material, which may further attenuate the optical fibers 116 on a micro-bending scale. Because buffer tubes 112 disclosed herein are particularly flexible, bending the buffer tubes 112 may attenuate the optical fibers on a macro-bending scale. As such, while optical fibers used with some embodiments disclosed herein may be standard or traditional optical fibers, according to other exemplary embodiments, the optical fibers 116 may be designed or selected to have bend insensitive properties.

In some such embodiments, each optical fiber 116 includes a glass core 120 surrounded by a glass cladding 122. The glass cladding 122 includes annular regions or layers, such as at least two layers, at least three layers. A first of the annular regions has a refractive index that is lower than the average refractive index of the core 120, which thereby reflects errant light back to the core 120. A second of the annular regions of the cladding 122 has a refractive index that differs from the first of the annular regions. The second annular region may be up-doped, trapping errant light from the core 120 and improving the performance of the optical fiber 116 in terms of reduced attenuation from macro-bending. Or, the second annular region may be down-doped, further reflecting errant light from the core 120 and improving the performance of the optical fiber 116 in terms of reduced attenuation from macro-bending. According to an exemplary embodiment, the optical fibers 116 of the fiber optic assembly 110 are bend insensitive such that with one turn around a 10 millimeter diameter mandrel, each optical fiber 116 exhibits an attenuation increase of less than 0.5 decibels at a wavelength of 850 nanometers, with one turn around a 15 millimeter diameter mandrel, each optical fiber 116 exhibits an attenuation increase of less than 0.2 decibels at a wavelength of 850 nanometers; and with one turn around a 20 millimeter diameter mandrel, each optical fiber 116 exhibits an attenuation increase of less than 0.1 decibels at a wavelength of 850 nanometers.

According to an exemplary embodiment, the glass cladding 122 of each optical fiber 116 is surrounded by polymer layers 124, such as interior and exterior layers of ultra violet light curable acrylate materials or other polymeric materials. The interior polymer layer (e.g., soft layer, stress-isolation layer) has a lower modulus of elasticity than the exterior polymer layer (e.g., hard layer, shell), such as by at least half the modulus of the exterior layer. Accordingly, if the optical fiber 116 in the buffer tube 112 contacts filler particles extending inward from the interior of the buffer tube 112 or other protrusions, the exterior polymer layer of the optical fiber 116 limits scratching and wear of the optical fiber 116 and the interior polymer layer mitigates transmission of stresses to the glass core 120 and cladding 122, which, in turn, limits associated attenuation from micro-bending.

The construction and arrangements of the fiber optic assembly, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. For example, technology disclosed herein relates primarily to buffer tubes used in loose tube cable designs, but also applies to ribbon and fire-retardant fiber optic cables. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic assembly, comprising:
a plurality of optical fibers
a buffer tube forming an elongate passage, wherein the plurality of optical fibers are positioned in the passage of the buffer tube,
wherein the buffer tube comprises at least one layer of a composite material, wherein the composite material of the buffer tube comprises a base material and a filler material blended into the base material,
wherein particles of the filler material have an acicular structure, the particles having a longest dimension that is on average at least ten times a narrowest dimension of the particles, and
wherein the buffer tube has kink resistance such that when the buffer tube is formed into a loop of 85 millimeters in diameter with a plastic ring of about 2 centimeters in interior diameter holding the cross-over point of the loop, and when the loop is then constricted by fixing one side of the buffer tube and drawing the other side of the buffer tube through the ring at a rate of 250 millimeters per minute to decrease the size of the loop, kinking of the buffer tube occurs when the loop is 20 millimeters or less in diameter, where the diameter at kinking is the diameter corresponding to a peak drawing force applied that is then accompanied by a drop in at least 10% of that peak force thereafter upon continued constricting of the loop.

2. The assembly of claim 1, wherein kink performance of the buffer tube has little susceptibility to hydrolysis weakening such that the diameter of the loop resulting in kinking does not decrease by more than 25% after 30 days of aging of the buffer tube at 85 degrees Centigrade and at 85% relative humidity.

3. The assembly of claim 2, wherein the drawing force required to kink the buffer tube by constricting the loop is at least 0.5 newtons.

4. The assembly of claim 1, wherein crush performance of the buffer tube has little susceptibility to hydrolysis weakening such that the load required for 25% deflection does not decrease by more than 20% after 30 days of aging of the buffer tube at 85 degrees Centigrade and at 85% relative humidity.

5. The assembly of claim 1, wherein the base material of the buffer tube comprises at least one of a polypropylene copolymer and a thermoplastic polyolefin.

6. The assembly of claim 5, wherein the base material is a thermoplastic polyolefin having an unfilled modulus of elasticity in the range of 1450-1700 megapascals.

7. The assembly of claim 6, wherein the filler material raises the modulus of elasticity of the base material such that the composite material of the buffer tube has a modulus of elasticity of at least 2000 megapascals.

8. The assembly of claim 5, wherein the filler material comprises a solid powder.

9. The assembly of claim 8, wherein the filler material comprises an inorganic material.

10. The assembly of claim 8, wherein the ratio of the filler material to the base material by volume is in the range of 2 to 40 percent.

11. The assembly of claim 8, wherein the composite material facilitates manufacture of particularly narrow buffer tubes, such that the buffer tube has an outer diameter of 2.4 millimeters or less and contains at least twelve optical fibers.

12. The assembly of claim 11, wherein the buffer tube has an outer diameter of 2.2 millimeters or less.

13. A fiber optic assembly, comprising:
a plurality of optical fibers;
a buffer tube forming an elongate passage, wherein the plurality of optical fibers are positioned in the passage of the buffer tube,
wherein the buffer tube comprises a composite material, wherein the composite material of the buffer tube comprises a base material and a filler material blended into the base material, wherein the ratio of the filler material to the base material by volume is in the range of 2 to 40 percent, wherein the base material comprises at least one of a polypropylene copolymer and a thermoplastic polyolefin, wherein the filler material comprises a solid powder, wherein the filler material comprises an inorganic material, wherein particles of the filler material have an acicular structure, and
wherein the buffer tube has strong kink resistance such that when the buffer tube is formed into a loop of 85 millimeters in diameter with a low-friction plastic ring of about 2 centimeters in interior diameter holding the cross-over point of the loop, and when the loop is then constricted by fixing one side of the buffer tube and drawing the other side of the buffer tube through the ring at a rate of 250 millimeters per minute to decrease the size of the loop, kinking of the buffer tube occurs when the loop is 20 millimeters or less in diameter, where the diameter at kinking is the diameter corresponding to the peak drawing force applied that is then accompanied by a drop in at least 10% of that peak force thereafter upon continued constricting of the loop; and water-swellable material positioned in the passage of the buffer tube.

14. The assembly of claim 13, wherein the water-swellable material comprises a powder of superabsorbent polymer having an average volume-based particle size of 60 micrometers of less.

15. The assembly of claim 14, wherein the water-swellable powder lines the passage.

16. The assembly of claim 14, wherein the water-swellable powder is attached to the interior of the cavity.

17. The assembly of claim 13, wherein the composite material has a modulus of elasticity of at least 2000 megapascals.

18. The assembly of claim 13, wherein the buffer tube has an outer diameter of 2.4 millimeters or less and contains at least twelve optical fibers.

19. The assembly of claim 13, wherein crush performance of the buffer tube has little susceptibility to hydrolysis weakening such that the load required for 25% deflection does not decrease more than 20% after 30 days of aging of the buffer tube at 85 degrees Centigrade and at 85% relative humidity.

20. The assembly of claim 13, wherein kink performance of the buffer tube has little susceptibility to hydrolysis weakening such that the diameter of the loop resulting in kinking does not decrease more than 25% after 30 days of aging of the buffer tube at 85 degrees Centigrade and at 85% relative humidity.

* * * * *